United States Patent [19]

Cherney

[11] Patent Number: 5,466,326
[45] Date of Patent: Nov. 14, 1995

[54] CONTINUOUS MOTION HEAT SEAL CONTROL

[75] Inventor: Dale M. Cherney, Howards Grove, Wis.

[73] Assignee: Hayssen Manufacturing Company, Sheboygan, Wis.

[21] Appl. No.: 319,466

[22] Filed: Oct. 6, 1994

Related U.S. Application Data

[63] Continuation of Ser. No. 961,124, Oct. 14, 1992, abandoned.
[51] Int. Cl.⁶ ........................................................ B32B 31/00
[52] U.S. Cl. .............................. 156/359; 156/497; 493/8; 53/51
[58] Field of Search ...................... 156/359, 497, 156/499; 53/51, 64, 75; 493/8, 10

[56] References Cited

U.S. PATENT DOCUMENTS

| 4,218,863 | 8/1980 | Howard et al. ............................ 53/547 |
| 4,242,166 | 12/1980 | Izumihara ................................ 156/351 |
| 5,234,531 | 8/1993 | Ballestrazzi et al. .................... 156/359 |

*Primary Examiner*—David A. Simmons
*Assistant Examiner*—J. Sells
*Attorney, Agent, or Firm*—Lee, Mann, Smith, McWilliams, Sweeney & Ohlson

[57] ABSTRACT

In a continuous motion hot air sealer the amount of heat applied to the area of film to be sealed is varied in accordance with the velocity of the film by programming the hot air generator in a straight line relationship between sealing temperature and film velocity as determined from data on high speed temperature and low speed temperature which will produce good heat seals.

12 Claims, 2 Drawing Sheets

CONTINUOUS MOTION HEAT SEAL CONTROL

This application is a continuation of application Ser. No. 961,124, filed Oct. 14, 1992, now abandoned.

This invention relates to an apparatus for sealing a continuously moving web of plastic film such as polyethylene and an energy control by means of which a consistent, effective and aesthetic heat seal may be obtained regardless of variations in film velocity.

BACKGROUND OF THE INVENTION

For many years drag sealers, heated wheels and hot air guns have been used to provide a heat seal for moving webs of film. The film is usually formed around a package to form a tube and the lap seal is then made with a heat seal device which can seal the film while it is moving through the packaging machine. Some typical devices consist of drag sealers, heated wheels, hot air guns and heated and cooled belts.

In U.S. Pat. No. 4,218,863 there is shown a continuous motion wrapping machine which utilizes a resistance type air heater in combination with an endless heat sealing belt having perforations which allow for the passage of heated air therethrough to seal the overlapping longitudinal edges of the tubular film. The patent recognizes the problem of changes in the speed of operation of the machine by stating that the temperature of the air may be varied by varying the electrical power supplied to the resistance type air heater or by varying the volume of air through the air heater. While the patent does not further discuss the means of varying of electrical power to the resistance type air heater, it does disclose the use of three solenoid valves which may be operated during different speeds of the machine to allow for selected release of heated air from the hot air nozzle and thus prevent this released hot air from being applied to the film.

This type of hot air sealing device as well as the previously mentioned drag sealers, heated belts and heated wheels provide a seal of consistent quality so long as the three variables of time, temperature and pressure are maintained. Pressure is generally related to the stretch of the film around the product or the pressure exerted by the heated wheel or drag sealer, sometimes with a stationary back up. Where an endless belt is used, pressure may be applied directly to the product. For most applications, this pressure is essentially independent of velocity and temperature and can be regarded as a constant. Temperature is the temperature of the sealing media, i.e., the media which causes the sealing of the film. This can be the temperature of the drag seal or the sealing wheel which is in contact with the film or it can represent the temperature of the heated air which is being blown onto the surface of the film through a hot air gun or through an endless perforated belt. Time is inversely related to velocity. The faster the film runs, the less the sealing time (the time the sealing media is in contact with the portion of the film to be sealed). If it is desired to change the velocity of the film while it is running through a machine, and in order to maintain consistent seal quality it is necessary to modify either time, temperature or pressure to compensate for the change in velocity. Since pressure is a constant the only variable available to compensate for a change in sealing time (velocity) is temperature.

In most applications temperature is regarded as a constant, since it is usually difficult to change the temperature of a heated mass such as a heated wheel or drag seal over a short period of time. With such sealers the seal quality is not consistent with a variable sealing time, i.e. with a variable velocity of the film through the packaging machinery. This is because a change in speed will either produce a burn-through of the seal area caused by the film melting at speeds less than the desired run speed or lack of a good seal at speeds in excess of the desired run speed due to the decreased sealing time. This is particularly true when starting or stopping the equipment or when the equipment is slaved to upstream or downstream equipment with varying production rates which cause variations in the speed of the sealing machine.

Since machines of this type typically run at a wide range of speeds, i.e. 0–300 packages per minute, under varying conditions and generally require a controlled acceleration to get to the desired velocity, seal quality has consistently been a problem especially as it relates to starting and stopping.

The direct result of these limitations would be scrap product produced when machines of this type change speeds to match production conditions. This limitation has been a factor in the development of high speed continuous packaging machines using plastic films.

Hot air has been used for many years to produce seals for these types of packaging and film converting machinery. Hot air systems have distinct advantages over the other systems in that the temperature can be changed very rapidly to match the desired conditions. By contrast most drag sealers or wheels use a considerable amount of thermal mass to accomplish the sealing and as a result they can not be responsive to a rapid change in temperature.

A typical hot air sealing apparatus consists of a quartz heater which produces heat energy as a function of the resistance of the wire used to wind the coils of the heater. The amount of heat produced measured in watts can be expressed as the input voltage times the input current.

By regulating the input power duty cycle with a temperature controller the temperature generated in the coil can be regulated. The temperature controller closes a power loop by sensing the temperature of the discharged air with a sensor such as an RTD or a thermocouple.

The heater requires air to be blown over the coil to remove the heat generated in the coil and keep the coil from burning out. This heat is then directed to the seal area to supply the required energy to seal the package. Since it is desired to maintain a minimum heat for start-up the heat will continue after the film stops and during these stops it is thus often necessary to redirect the heat away from the sealing area and away from the film which is stationary. This may be done by incorporating the heater in a moveable arm which is brought down to the film prior to movement and allowed to retract when the film velocity reaches zero. This procedure can also cause additional problems related to reaction time of the arm as a function of film velocity. Another prior art alternative has been to use an articulated deflection shield to divert the hot air when the machine is stopped. Still another alternative has been to release the hot air through valves as shown in U.S. Pat. No. 4,218,863.

Prior to this invention the control system for hot air seals included a motion controller, a temperature control unit and a programmable controller or PLC used as the coordinator of the system. The motion controller controls the speed of the packaging operation or the velocity of the film passing through the packaging machine. Typically the motion controller operates packaging machinery selectively at several different and discrete predetermined speeds. The temperature controller controls the power to the heating coil and typically there is a high and a low temperature selection for the temperature controller. In coordinating the system, the PLC enables the motion controller determining the speed at which the machine is to be run, and relays or sends the information to the motion controllers. The PLC also controls the status of the temperature controller by enabling the system and energizing either the high temperature set point or low temperature set point based upon the speed being requested of the motion controller by the PLC. The PLC may then coordinate the high speeds programmed into the motion controller with the high sealing temperature programmed into the temperature controller, and coordinate the low speeds programmed into the motion controller with the low sealing temperature programmed into the temperature controller.

In addition, in order to achieve better seal quality, flutes, valves, or other bypasses have been used and are controlled through the PLC as a function of film velocity. The faster the film runs, the more the flutes, valves or other hot air bypasses are closed to direct more hot air to the sealing area. As the speed decreases more flutes, valves, or other hot air bypasses are opened to bypass more hot air away from the sealing area, thus in effect reducing the quantity of heat by bypassing or releasing much of the sealing energy to the atmosphere. Although the bypassing of the sealing energy to the atmosphere at low speeds and the redirecting of the sealing energy to the seal area for high speeds has helped, the seal quality is not usually consistent in seal width or appearance. In addition the effect of opening flutes, valves or other bypasses in accordance with the speed of the film provides a stepped response and does not provide a smooth linear transition from one speed to another, which therefore affects the quality and appearance of the seal.

SUMMARY OF THE INVENTION

In accordance with this invention an apparatus is provided for sealing a continuous moving web of film where it is required that one film surface be sealed to another. A hot air applying means is provided for applying sufficient energy to the film to form a seal as the film is moving through the apparatus. Means is provided for sensing the velocity of movement of the film through the apparatus and control means responsive to the film velocity sensing means varies the amount of energy applied to the area to be sealed via the hot air applying means in a constant proportional relationship to the speed of the movement of the film through the apparatus.

In accordance with the preferred form of the invention, the hot air applying means includes variably energizable means for varying the amount of energy applied to the area to be sealed and the control means includes means for calculating a relationship between sealing temperature and film velocity for a given film based upon inputted determinations of (1) the sealing temperature necessary to achieve a good seal at a given high film velocity and (2) the sealing temperature necessary to achieve a good seal at a given low film velocity. The control means preferably includes means for energizing the variably energizable means in proportion to the velocity of the film and in accordance with the calculated relationship between the sealing temperature and the film velocity for that film. The relationship can be expressed as a straight-line relationship or any relationship where temperature is expressed as a function of velocity.

It is an object of this invention to provide a system which will achieve consistent seal quality regardless of film velocity thereby improving seal quality and appearance. The system reduces set up time and allows compensation for operational variables "on the fly".

While in the preferred embodiment the varying of the energy applied to the area to be sealed is accomplished by variably energizing the heating element in the hot air applying means, the novel aspects of the invention may also be incorporated into the operation of a moveable deflector. In this alternative embodiment the control means includes a movable deflector which is variably positionable between the hot air applying means and the area of the film to be sealed for deflecting varying amounts of the hot air from the sealed area of the film as required. A deflector moving means is provided which is responsive to the film speed sensing means for moving the movable deflector through a smooth linear transition to a selected variable position in or between a first position in which a minimum amount of hot air is deflected by the deflector and a second position in which a maximum amount of hot air is deflected by the deflector, with the selected variable position at any instant being such that the amount of non-deflected hot air applied to the area of the film to be sealed by the hot air applying means at that instant will be proportional to the speed of movement of the film through the sealing apparatus at that instant.

The invention provides a novel method of controlling the heat applied by the heat sensing means to the area to be sealed of a given heat sealable film moving at various velocities. This method includes the steps of determining for the given film a first temperature necessary to achieve a good seal at a given high film velocity and a second temperature necessary to achieve a good seal at a given low film velocity, calculating a relationship between temperature and velocity, sensing the instantaneous velocity of the film and generating an instantaneous temperature controlling energy output to the heat sealing means to regulate heat applied by the heat sealing means in proportion to the instantaneous velocity of the film and in accordance with the calculated straight-line relationship between the temperature and velocity for that film.

DESCRIPTION OF THE PREFERRED EMBODIMENTS

The invention is described below with respect to specific embodiments relating to hot air sealing of plastic film in packaging machinery. It will be evident that the concepts of the invention can be used in any apparatus requiring the sealing of one film surface to another. The invention precisely controls the amount of energy per unit area imparted to the film surfaces so that no matter at what velocity the film may travel, a perfect seal is effected at all times.

Figure 1:
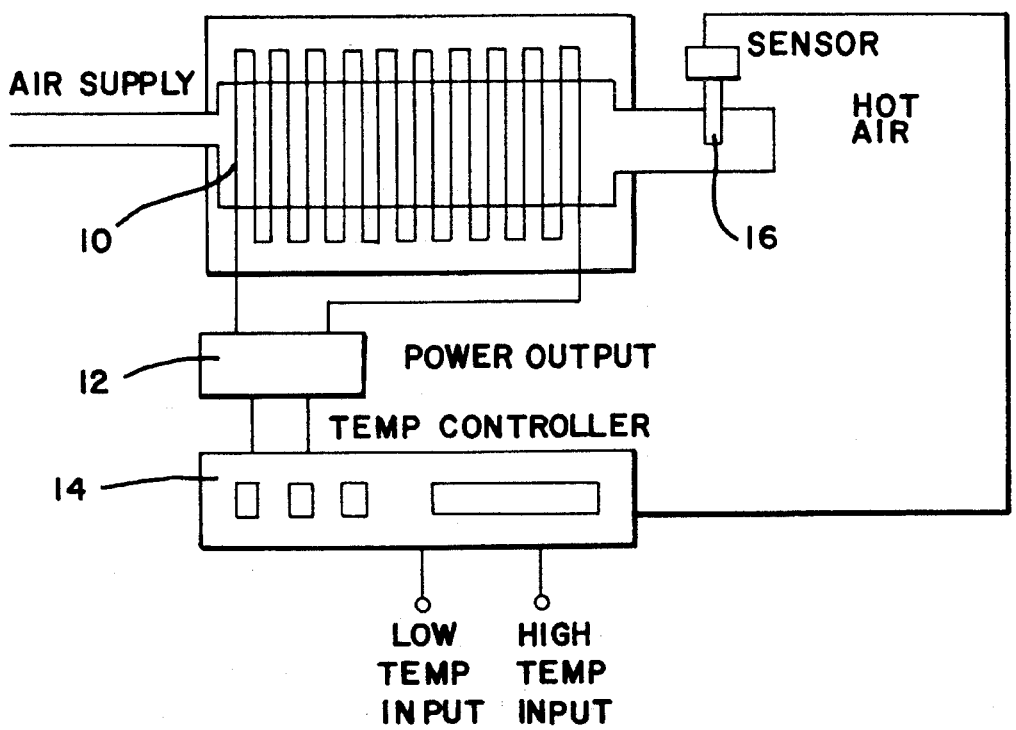
FIG. 1 is a schematic view of a prior art hot air temperature generating and control system for a hot air seal unit used in the packaging machinery industry.

With further reference to the drawings, in FIG. 1 there is shown a schematic representation of a typical prior art hot air seal heater and heater control. In this schematic a supply of air is blown by a blower (not shown) across a heating coil 10 selectively energized by a power supply 12 controlled by a temperature controller 14. In this set-up a quartz heater produces heat as a function of the resistance of the wire used to wind the coils. The amount of heat produced measured in watts can be expressed as the input voltage times the input current. By regulating the input duty cycle with the temperature controller 14 the temperature generated in the coil 10 can be regulated. The temperature controller 14 energizes the power supply 12 to activate the coil 10 by sensing the temperature of the discharged air with a sensor 16, which may be an RTD or a thermocouple.

The heater requires air to be blown over the coil to remove the heat generated in the coil and keep the coil from burning out. The heat is then directed to the seal area to produce the required energy to seal the package. In this schematic illustration the temperature controller 14 enables the power supply 12, and there is a low temperature and high temperature selection on the temperature controller, as described with respect to FIG. 2. The sensor 16 or controller 14 may include an alarm which sounds if the temperature in the hot air device becomes too high or too low.

Figure 2:
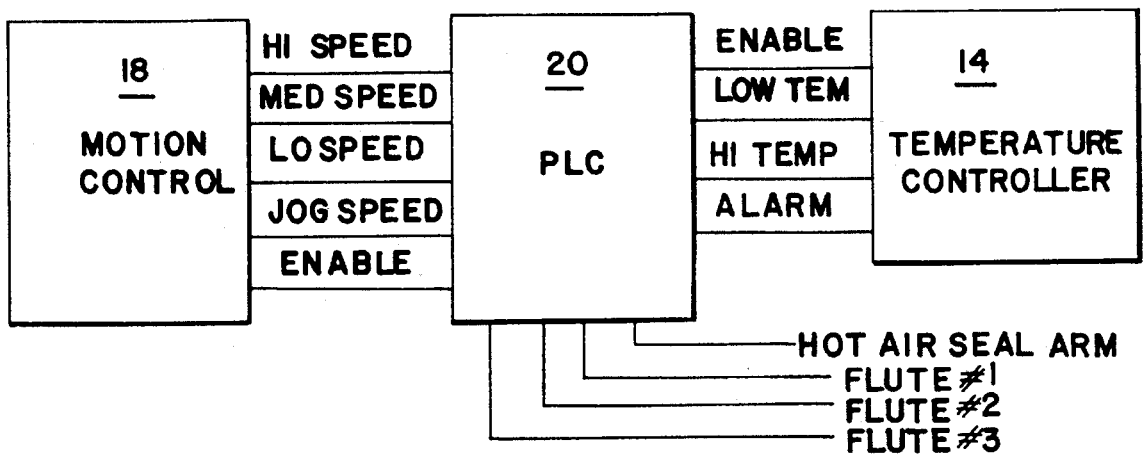
FIG. 2 is a schematic view of a prior art hardware configuration for a hot air seal temperature and film velocity or speed control.

In FIG. 2 there is shown one type of prior art control system for a hot air seal. In addition to the temperature controller 14, just described, the system includes a motion controller 18 and a PLC 20 which is used as the coordinator of the system. Typically the PLC 20 is coupled to the temperature controller 14 and motion controller 18 through external inputs and outputs (I/O's) as illustrated. In this scheme the PLC 20 enables the motion controller 18, it determines the speed at which the packaging machine is to be run, and it relays these speed commands to the motion controller 18. In this particular scheme the PLC can select from among four speeds for the motion controller 18.

In addition, the PLC 20 controls the status of the temperature controller 14 for the hot air seal by enabling the system and energizing either a high temperature set point or a low temperature set point for the temperature controller based upon the speed commands which the PLC is relaying to the motion controllers 18.

In this version the motion controller 18, in addition to receiving commands from the PLC 20, may sense the variations in the film speed and pass this information back to the PLC. The PLC may use this information in order to determine whether to energize the high temperature set point or the low temperature set point of the temperature controller 14. In FIG. 2 the PLC 20 is indicated as also controlling a hot air seal arm (not shown) which moves the hot air seal into and out of its sealing position. The seal arm moves the hot air seal out of position when the packaging machinery is at rest or during initial start up or the shut down of the machinery. In the schematically illustrated set-up there are three flutes (not shown) which are controlled by the PLC 20. Each of these flutes would cause a quantity of air from the air supply to bypass the heating element 10 in its path to the sealing area. The faster the film runs the more flutes are closed to direct more air across the heating coil 10 to the sealing area. As the speed decreases more flutes are opened to cause more air to bypass the heating coil 10 to the sealing area thus, in effect, cooling the seal by bypassing much of the sealing energy supplied by the heating coil.

Instead of the flutes, the PLC 20 could control valves of the type disclosed in U.S. Pat. No. 4,218,863 which may be selectively opened one at a time in order to release heated air from the air nozzle in the hot air seal device.

In the prior art devices the seal quality is thus aided by bypassing some of the air around the energized heating coil or releasing the heated air into the atmosphere at low speeds, and by causing more heated air to reach the seal area at high speeds. However, the seal quality with such prior art devices has not been consistent in seal width or integrity. In addition, the opening of flutes or valves and/or the stepping of temperatures has resulted in a stepped response to seal quality and does not provide a smooth linear transition from one speed to the other in order to provide an entirely consistent seal in width and quality.

Figure 3:
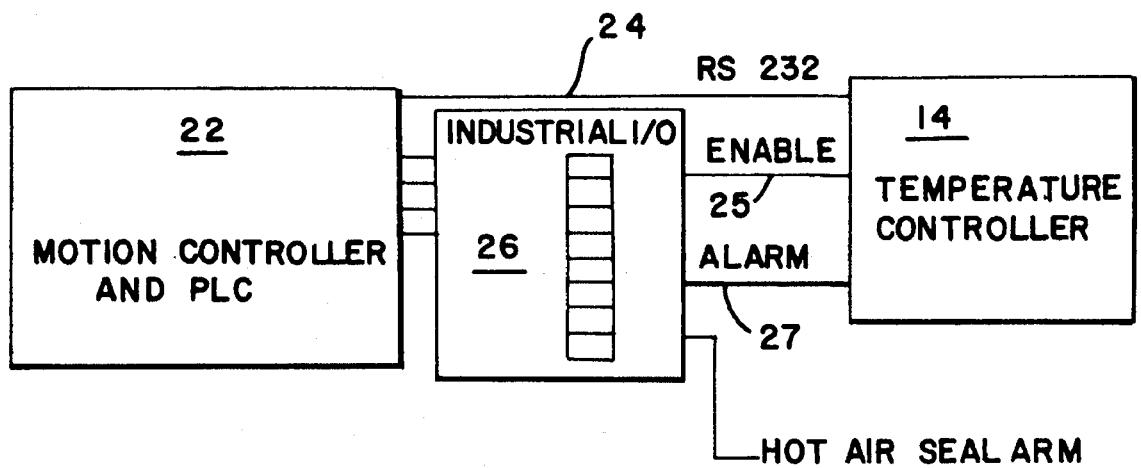
FIG. 3 is a schematic view of the hardware configuration embodying the hot air seal temperature control and method of this invention.

In FIG. 3 there is schematically shown a hot air seal heat control embodying the present invention. In this embodiment the motion controller and the PLC functions have been integrated into one motion controller/PLC 22. This allows a direct control of motion, i.e., film speed, without any external I/O to connect the two functions. Thus, the PLC and motion control operations become very tightly coupled, and this allows the combined controller to calculate a desired temperature for any given speed based upon calibration data which has been programmed into the motion controller/PLC 22. This will be explained in additional detail below.

It will also be noted that the temperature control is of the same configuration as described in connection with the prior art devices, but there is an RS-232 communications link 24 between the temperature controller 14 and the motion controller/PLC 22. The second temperature set point option has been removed, and the only interface lines are the enable output 25 to the temperature controller 14 and the alarm feedback 27 from the temperature controller. The enable output 25 and the alarm feedback 27 as well as the operating control for the hot air seal arm are interfaced with the motion controller/PLC 22 through a standard industrial input/output device 26.

Since this arrangement allows very tight control of the system there is no necessity for any flutes or valves, and all air is heated and is continually directed at the seal area for all speeds. The command temperatures are sent across the RS 232 serial port from the main controller, i.e. the motion controller/PLC 22, to the temperature controller 14. It is also possible to interface with the temperature controller 14 through an analog I/O (0–10 volt signal) which would then command the temperature controller 14 to respond to the analog set point. Either method of interfacing the motion controller/PLC 22 with the temperature controller 14 is possible using commercially available hardware (Athena 1900 series, for example).

Figure 4:
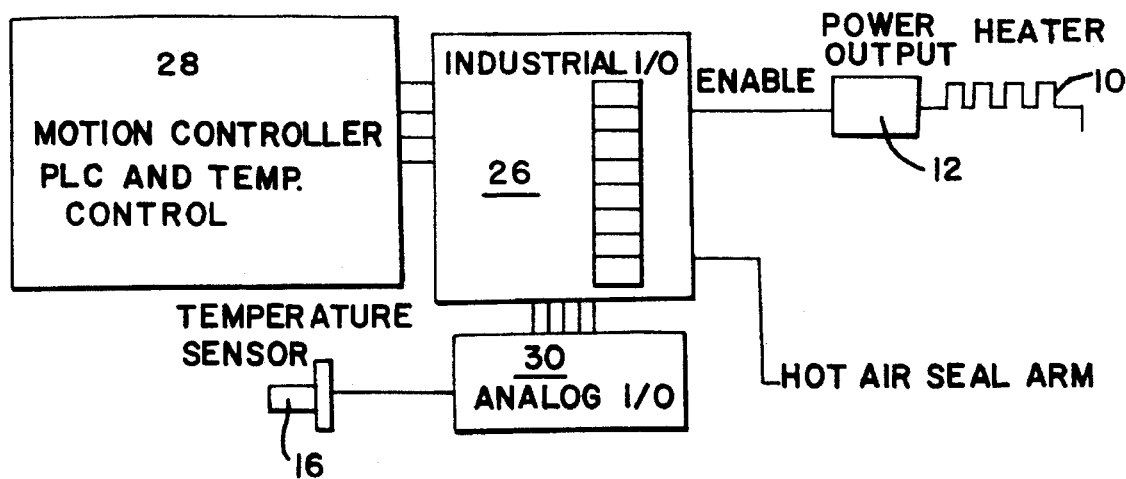
FIG. 4 is a schematic view of another embodiment of a hot air seal temperature control hardware configuration incorporating this invention.

In FIG. 4 there is shown a schematic view of a hot air seal control in which there is a further consolidation of the temperature control function into a single main controller 28. The integration of the temperature control function with the motion control and PLC functions into a single main controller 28 eliminates the need for any stand alone controllers. In order to accomplish this the main controller 28 must have provisions for execution of a temperature control PID loop as well as a method for converting the sensor input into a signal which can be handled by the main controller. One such main controller which may be used is the BAM-X32 controller manufactured by Berkeley Process Control. The interface with the temperature sensor 16 is through an analog I/O 30 which conditions the signal which is then fed to the main controller 28 through a standard industrial I/O 26. The signal conditioning analog I/O is available through Opto-22, for example, model AD10T2.

The temperature controlling output from the main controller 28 is through the standard industrialized I/O 26 which feeds this output to a power output module 12 to control the high currents required for the heating element 10. This power module is available through Opto-22, for example, model 380D25. In this system all enable and alarms are now internal in the main controller 28 and there is no need to display signals on any I/O display for the system.

The systems shown in FIGS. 3 and 4 are identically programmable. The first program requirement is to generate a routine to calculate the sealing characteristics of the film being run. Different films, such as different types or thicknesses of polyethylene, require different sealing energies to effect a seal. This is done in a calibration mode. The calibration mode calculates a straight line approximation between two calibration points which will define the relationships between film velocity and sealing temperature. Once this calibration is made for a particular film it is stored into memory in the controller 28, and for any film velocity the program of the controller 28 will instantaneously determine the required sealing temperature and the PLC function of the controller 28 will control the power output 12 (through the stand alone temperature controller 14 in the FIG. 3 embodiment) to supply precisely the amount of power to the heating coil 10 thereby produce the proper sealing energy.

The two calibration points or parameters are first determined. The first parameter is established by determining the temperature (T1) required to achieve good seals at a predetermined high film speed (or velocity). This data is then entered into the controller 22 or 28 via touch screen or other appropriate input device (not illustrated). The predetermined high speed is a speed which can be used rather easily without excessively wasting film during the set up process.

In a similar manner, the second parameter is established by determining the temperature (T2) required to achieve good seals at a predetermined low film speed or velocity and that temperature and speed data is entered on the touch screen in the same typical manner. There should be as great a spread between the high speed temperature and the low speed temperature as possible, because the greater the spread between the two extremes, the more accurate the calibration will be. While good seal quality is determined by the individual calibrating system and is done on a trial and error basis, it has been found that this is a very accurate and relatively easy method of calibration and can be used universally to insure good seals at all the velocity points within the range of the machine.

Thus, the following data has been entered in the controller 22 or 28: T1=high speed temperature; Vh=high speed velocity; T2=low speed temperature; Vl=low speed velocity. With this data a straight line approximation can be established by the equation:

$$Y=MX+B$$

where M and B are constants. The relationship of the variables in the equation is:

Run Temperature=$M$(Film Velocity)+$B$

Solving for M, where M represents the slope of the curve:

$$M=(T1-T2)/(Vh-Vl)$$

Solving for B with Film Velocity=Vh and Run Temperature=T1:

$$T1=M(Vh)+B$$

or

B=T1−M(Vh), where B represents the zero velocity temperature intercept.

Since the straight line relationship for a linear film is:

Run Temperature=$M$(Film Velocity)+$B$, and knowing the constants M and B, the Run Temperature for any film velocity can easily be determined. These constants are stored in the non-volatile memory of the controller (22 or 28) with the other program parameters. When there are changes in the film velocity the temperature for the hot air seal is automatically adjusted to that determined by the straight line calculation outlined above. Once calibrated the Run Temperature is sent to the controller and the machine will run with a closed loop relationship between temperature and velocity according to the previously mentioned relationship.

While the calibration process of the preceding paragraph functions well for most instances, additional temperature and velocity values can be used for calibration, particularly if the film is non-linear in its characteristics. Also, if the sealing characteristics are known and can be expressed in the form of an equation, that equation can be entered and used, and two point or multipoint calibration would not be needed.

In order to compensate for daily variations in such external factors as ambient temperature, humidity, barometric pressure, etc., a temperature offset may be provided which will displace the curve by the amount of the offset entered, so that all points on the line will be displaced an equal amount. In essence, the value of constant B is changed to create the offset. Since all parameters are stored in the non-volatile RAM for future reference, the system provides for an instant "one button set up" for product or film formulation changes. With the integrated version of the system as schematically depicted in FIG. 4, film movement can be inhibited until the temperature controller has been brought up to the preset temperature, thus preventing scrap.

Figure 5:
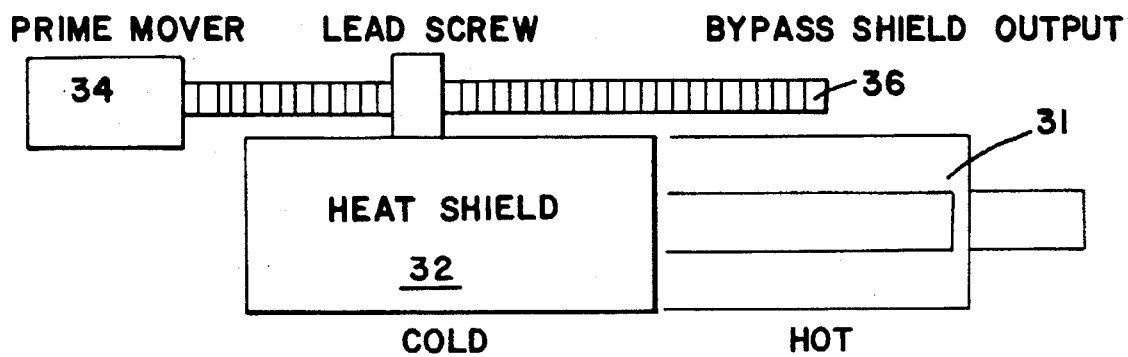
FIG. 5 is a schematic view of another hot air seal temperature control unit incorporating aspects of the present invention.

While it is preferred that the seal control be a control for the operation of the heating coil 10 of a hot air seal apparatus, as shown in FIG. 5 the control can be used in conjunction with a deflector or heat shield 32 which may be adjustably positioned to bypass an amount of air as a function of film velocity. In this system a constant sealing temperature and air flow will be provided and the deflector 32 merely moves between the film and the hot air seal to regulate the amount of hot air which reaches the overlapped portions of the film.

In this arrangement, the deflector or heat shield 32, driven by a prime mover 34 such as a reversible stepper motor, may be selectively positioned to cause the quantity of hot air reaching the seal area to be proportional to the film velocity. Since there is a constant ratio of hot air to film velocity, this arrangement results in a seal of consistent quality over a wide range of film velocities. As a possible alternative to a stepper motor, a linear cylinder could be employed as the prime mover 34 to variably position the heat shield 32. If the prime mover is a stepper motor as preferred in this embodiment, a lead screw 36 may be employed which is rotated by the prime mover 34 in order to adjustably position the heat shield 32 in front of the hot air seal unit 31.

The prime mover 34 is controlled in the same manner as described in connection with the temperature coils 10 of the embodiments of FIGS. 3 and 4, and the input parameters are the same, with the high speed and low speed temperatures determined by the position of the heat shield 32. This arrangement does have one advantage in that the heat shield 32 may be positioned so that all air from the hot air seal unit 31 is diverted from the seal area during the time that the film is stopped.

Although this system may have a tendency to produce a variable width seal as a function of velocity it could still be used as an alternative to the variable temperatures of the embodiments illustrated in FIGS. 3 and 4.

The linear relationship, Y=MX+B, discussed above presupposes a film having essentially linear heat transfer qualities as the temperature is increased or decreased dependent on film velocity. If the film does not exhibit such qualities, the program of the controller 22 or 28 must be altered to accommodate the non-linear condition. Again, however, the instantaneous velocity of the film is immediately translated by the controller into the output temperature (or position of the shield 32) for precise control of the energy imparted to seal the film.

Although the invention has been described with particularity, various modifications will be readily apparent to those skilled in the art, and such variations may be made without departing from the spirit and scope of the invention as defined in the appended claims.

What is claimed is:

1. In an apparatus for sealing a continuously moving web of film requiring one surface to be sealed to another, heat applying means for applying sufficient forced hot air energy to the film to make a seal as the film is moving through the apparatus, means for setting a change to a desired velocity of the movement of the film through the apparatus, and control means responsive to setting of said desired velocity for simultaneously determining the amount of forced hot air energy to be applied to the area to be sealed by said heat applying means, said control means being connected to said heat applying means so that said heat applying means varies the amount of forced hot air energy applied to the area to be sealed in accordance with a substantially constant, predetermined linear relationship, which is proportional to the desired velocity of the movement of the film through the apparatus.

2. The apparatus of claim 1 wherein said heat applying means includes variably energizable means for varying the amount of energy applied to the area to be sealed, and wherein said control means includes means for calculating a relationship between temperature and velocity for a given film based upon inputted determinations of the temperature necessary to achieve a good seal at a first film velocity and the temperature necessary to achieve a good seal at a second film velocity, and means for energizing said variably energizable means in proportion to the velocity of the film and in accordance with the calculated relationship between temperature and velocity for that film.

3. The apparatus of claim 2 in which said means for calculating includes means for calculating a straight line relationship.

4. The apparatus of claim 2 in which said first film velocity is a predetermined high film velocity and said second film velocity is a predetermined low film velocity.

5. The apparatus of claim 1 in which said heat applying means comprises a source of hot air.

6. The apparatus of claim 1 wherein said heat applying means includes an energizable heating element and said control means is responsive to said film speed sensing means to energize said heating element in a constant proportional relationship to the speed of movement of the film through the apparatus.

7. The apparatus of claim 1 wherein said control means includes a movable deflector variably positionable between said heat applying means and the film for deflecting varying amounts of energy generated by said heat applying means away from the film, and deflector moving means responsive to said film velocity sensing means for moving said movable deflector through a smooth transition to a selected variable position between a first position in which a minimum amount of energy is deflected by said deflector and a second position in which a maximum amount of energy is deflected by said deflector, the selected variable position of said deflector at any instant being such that the amount of non-deflected energy applied to the film by said heat applying means at the instant is proportional to the velocity of the film.

8. In an apparatus for sealing a continuously moving web of film requiring one surface to be sealed to another, energizable, non-contact heat applying means for directing forced hot air energy to the film to make a seal as the film is moving through the apparatus, means for setting a change to a desired velocity of the movement of the film as it is moving through the apparatus, and control means responsive to setting of said desired velocity to simultaneously determine the amount of forced hot air energy to be applied to an area to be sealed, said control means being connected to said heat applying means to control said heat applying means in accordance with a substantially constant predetermined linear relationship, which is proportional to the desired velocity of the movement of the film.

9. A method of controlling hot air energy applied by a heat sealing means to adjoining surfaces of a heat sealable film which are to be sealed to one another, the film moving at varying velocities, said method comprising the steps of determining for the given film a first forced hot air temperature necessary to achieve a good seal at a first film velocity and a second forced hot air temperature necessary to achieve a good seal at a second film velocity, calculating a relationship between said forced hot air temperatures and velocities, setting a desired velocity of the film, and generating a temperature controlling output to the heat sealing means to regulate the energy applied by the heat sealing means proportionally to the desired velocity of the film and in accordance with the calculated relationship between sealing temperature and velocity for that film.

10. A method according to claim 9 in which the step of relationship calculating includes calculating a straight line relationship.

11. A method according to claim 9 in which the first film velocity is a given high film velocity and the second film velocity is a given low film velocity.

12. A method according to claim 9 in which the step of determining includes determining for a plurality of velocities the temperature necessary to achieve a good seal at each film velocity.

* * * * *